United States Patent

Sugiura

[15] 3,702,908

[45] Nov. 14, 1972

[54] AUTOMATIC TAPE DRIVING SYSTEM FOR TAPE RECORDERS USING A LOW FREQUENCY SIGNAL WITH A NON-SIGNAL FOR REVERSING

[72] Inventor: Naokatsu Sugiura, Tokyo, Japan

[73] Assignee: Sansui Electric Co., Ltd., Tokyo, Japan

[22] Filed: Aug. 25, 1970

[21] Appl. No.: 66,762

[30] Foreign Application Priority Data

Aug. 27, 1969 Japan ......................44/67177

[52] U.S. Cl. ..................179/100.2 S, 179/100.2 MD

[51] Int. Cl.....G11b 15/06, G11b 23/18, G11b 27/22

[58] Field of Search...........179/100.2 S, 100.2 MD, 179/100.2 VC

[56] References Cited

UNITED STATES PATENTS 3,573,393 4/1971 Blackie et al....179/100.2 MD 3,461,249 8/1969 Kamoji et al.....179/100.1 VC

*Primary Examiner*—Bernard Konick
*Assistant Examiner*—Alfred H. Eddleman
*Attorney*—Flynn & Frishauf

[57] ABSTRACT

In an automatic tape driving system for a tape recorder utilizing a magnetic tape having first and second sound tracks which are used at the same time, a portion of the first sound track is recorded with a reverse signal of an inaudible low frequency, and a portion of the second sound track corresponding to the above described portion of the first sound track is not recorded with any signal. A logic circuit is connected to first and second signal channels associated with the first and second tracks to produce an output signal only when the first signal channel supplies thereto a signal corresponding to the reverse signal, and the second signal channel indicates the absence of a signal, to energize control means which reverses or stops the running of the magnetic tape.

5 Claims, 3 Drawing Figures

AUTOMATIC TAPE DRIVING SYSTEM FOR TAPE RECORDERS USING A LOW FREQUENCY SIGNAL WITH A NON-SIGNAL FOR REVERSING

This invention relates to an automatic tape driving system of a tape recorder, particularly a stereo-tape recorder.

In a conventional automatic tape driving system, for example an automatic reverse system, a signal of an inaudible low frequency, for example 20 Hz, is recorded on the start portion of the tape which is detected during a reproduction operation to automatically reverse the tape running. In this system, however, it is necessary to use a low pass filter having an extremely sharp characteristic as the reverse signal detecting means in order to discriminate the reverse signal from the audio signal. Further, an oscillator having a sharp characteristic is required to generate the reverse signal of 20 Hz to be recorded on the tape. Prior oscillators are operated by synchronizing it mechanically with the running of the tape. Such an oscillator and filter which are required to have sharp characteristics involve a large number of mechanical parts, thereby complicating construction and increasing the cost thereof. In spite of these elements of sharp characteristics in the prior art automatic reverse system, there often occurs misoperations in response to audio signals having frequencies close to the frequency of the reverse signal.

It is an object of this invention to provide an improved automatic tape driving system of a magnetic tape recorder capable of preventing mis-operation due to audio signals having frequencies close to the frequency of the reverse signal.

Another object of this invention is to provide simplified reverse signal generating and reproducing means.

SUMMARY OF THE INVENTION

According to this invention there is provided a novel automatic tape driving system for a tape recorder utilizing a magnetic tape having at least first and second sound tracks, characterized in that a portion of the first sound track is recorded with a reverse signal of an inaudible low frequency, that a portion of the second sound track corresponding to said portion of the first sound track has no signal recorded thereon, first and second signal channels being respectively associated with the first and second sound tracks, that a logic circuit is connected to the first and second signal channels to produce an output signal only when the first signal channel supplies thereto a signal corresponding to the reverse signal and the second signal channel supplies no signal, and that control means is provided to control the running of the magnetic tape in response to the output from the logic circuit.

Figure 1:
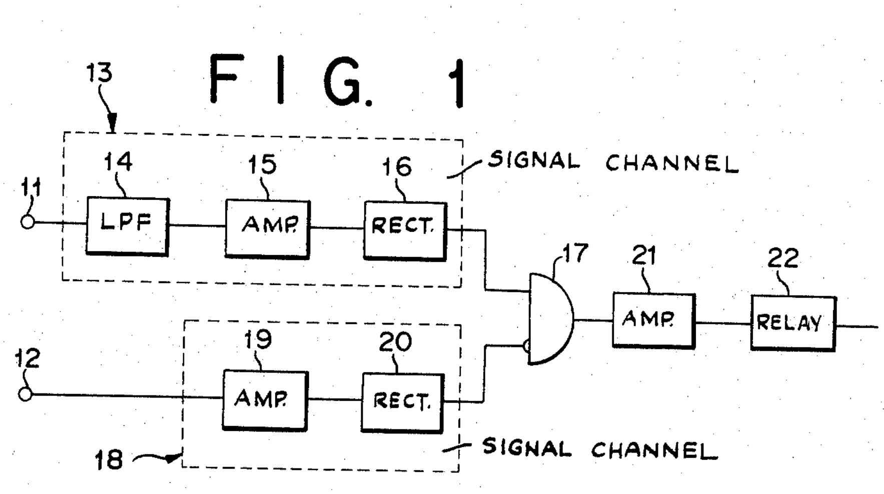
FIG. 1 shows a block diagram of an automatic tape driving system embodying this invention.

The automatic tape driving system shown in FIG. 1 comprises a pair of input terminals 11 and 12 connected to receive stereo-signals, that is the left signal (L signal) and the ritgt signal (R signal) reproduced by a magnetic head of the tape recorder not shown. The L input terminal is connected to one input of a logic circuit 17 through a first signal channel 13 including a series circuit of a low pass filter 14 having a center frequency of 20 Hz in the inaudible low frequency range, an amplifier 15 and a rectifier 16, whereas the R input terminal 12 is connected to the other input terminal of the logic circuit 17 similarly through a second signal channel 18 including serially connected amplifier 19 and rectifier 20. Actually the logic circuit 17 is an inhibit circuit which produces an output when the input terminal 11 receives a signal and the other input terminal 12 does not receive a signal. The output from the logic circuit 17 is supplied to a reversing relay 22 via an amplifier 21, the reversing relay 22 operating to reverse the running direction of the tape.

Figure 2:
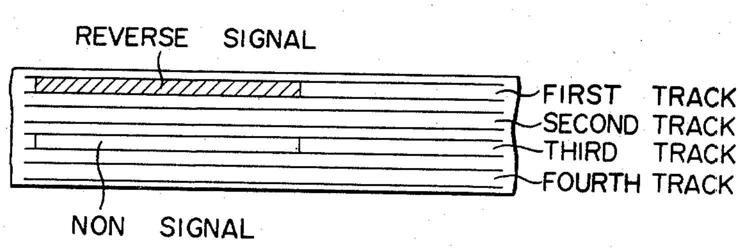
FIG. 2 is a plan view of a stereo magnetic tape for use in a tape recorder incorporated with the automatic tape driving system of this invention.
Figure 3:
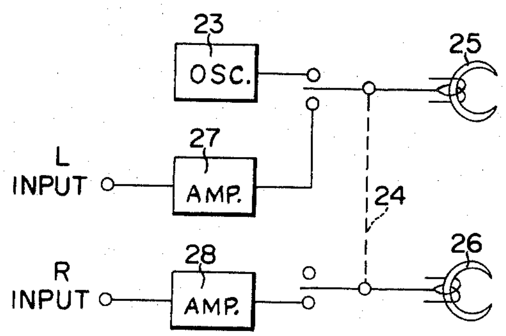
FIG. 3 shows a block diagram illustrating one example of a device for recording the reverse signal.

As shown in FIG. 2, the magnetic tape employed in the tape recorder incorporated with the novel tape driving system is provided with four sound tracks. On the ends of the first and third sound tracks are provided a portion recorded with a reverse signal (shaded portions) and a portion with no signal (non-shaded portions) respectively. The reverse signal recorded portion corresponds in position to the nonsignal portion and is recorded with an inaudible low frequency, such as 20 Hz, for a desired length. Recording of the reverse signal may be performed by connecting an oscillator 23 operating at a low frequency of 20 Hz and incorporated into the tape recorder to a recording head 25 belonging to the first track by means of a switch 24 manually operated by the operator, as shown in FIG. 3. At this time, a recording head 26 belonging to the third track is not supplied with any signal. The oscillator 23 may be a simple oscillator and is, for example a CR oscillator not required to have very sharp characteristics. Reference numerals 27 and 28 represent recording amplifiers connected in the L and R channels, respectively.

It is to be understood that the first and third tracks serve to reproduce or record the sounds during forward running of the tape whereas the second and fourth tracks serve to reproduce or record sounds during reverse running of the tape. The first and fourth tracks belong to the L-signal channel while the second and third tracks belongs to the R-signal channel.

The automatic tape driving system of this invention operates as follows:

As the magnetic tape is driven in the forward direction to reproduce audio signals recorded on its first and third tracks, at the end of the recorded signals, the portion of the first track recorded with the reverse signal and the non-signal portion of the third track pass by the reproducing head thereby to impress the reverse signal of 20 Hz on the L-input terminal 11. At this time no signal is impressed upon the R-input terminal 12. The received reverse signal is amplified by amplifier 15 after passing through the low pass filter 14 which is not required to have sharp characteristics and may be any filter that can pass signals having frequencies near 20 Hz, for example an RC filter. After being amplified, the reverse signal is rectified by the rectifier 16 and is then applied to one input of the logic or inhibit circuit 17. Since at this time no signal is applied to the other input of the inhibit circuit 17, the inhibit circuit produces an output signal which is amplified by amplifier 21 and supplied to reversing relay 22. Responsive to this signal the reversing relay 22 operates to reverse the direction of running of the tape, thus reproducing audio signals recorded on the second and fourth tracks.

By providing portions recorded and not recorded with the reverse signal for the second and fourth tracks, and by detecting same as and above described, the running direction of the tape can be reversed, or changed back to the forward direction.

Although there is a fear of mis-operation caused by audio signals having frequencies close to 20 Hz of the reverse signal, as is well known in the art, as the directivity of a sound wave generated by the same sound source decreases at lower frequencies, the signals in the left and right channels will have the same amplitude. Accordingly, in a stereo-tape recorder, signals in the left and right channels are recorded or reproduced at substantially the same level as the frequency of the signal involved in the stereo-tape recorder decreases, so that audio program signals having frequencies close to the frequency, that is 20 Hz, of the reverse signal are similarly recorded on both the first and second tracks. Signals on these tracks are picked up and are then impressed upon L and R-input terminals 11 and 12 respectively and are applied simultaneously to both inputs of the logic circuit respectively through first and second signal channels 13 and 18. Consequently, the logic circuit 17 produces no output signal, and thus does not energize reversing relay 22. Thus mis-operation causing reversal of the running direction of the tape can be precluded, whereas with the prior art systems misoperation could occur under these conditions.

The frequency of the reverse signal is not limited to 20 Hz. Further instead of applying the reverse signal to the left channel it may be applied to the right channel. Further, the reversing relay 22 may be replaced by a stopping relay which functions to stop the tape running. Relay 22 may be replaced by other switching means, such as solid state switching devices.

Thus it will be clear that this invention provides a novel tape driving system which is not required to use an oscillator of a sharp characteristic for producing the reverse signal to be recorded on a magnetic tape, and does not require a low pass filter having sharp intercepting characteristics to process the signal produced by the reverse signal. Thus, it it possible to reduce the cost of manufacturing, and the occurrence of misoperations caused by audio signals having frequencies close to the frequency of the reverse signal can be prevented.

What is claimed is:

1. In an automatic tape driving system for a tape recorder utilizing a magnetic tape having at least first and second sound tracks which are used at the same time, and having first and second signal channels corresponding to said first and second sound tracks, the improvement wherein:

the first sound track has a given portion recorded with a reverse signal of an inaudible low frequency, and the second sound track has a given portion not recorded with any signal, said given portions of the first and second sound tracks occupying corresponding locations along the length of said magnetic tape and being simultaneously played back; and said driving system includes: a logic circuit coupled to said signal channels for generating an output only when said first signal channel supplies thereto a signal corresponding to said inaudible low frequency reverse signal recorded on said given portion of said first sound track and said second signal channel provides thereto no signal; and means responsive to the output from said logic circuit to control the movement of said magnetic tape.

2. The automatic tape driving system according to claim 1 wherein said first signal channel comprises a series circuit of a filter, an amplifier and a rectifier; and said second signal channel comprises a series circuit of an amplifier and a rectifier.

3. The automatic tape driving system according to claim 1 wherein said logic circuit comprises an inhibit circuit.

4. The automatic tape driving system according to claim 1 which further comprises an oscillator producing said reverse signal of inaudible low frequency, means to record said reverse signal on said given portion of said first track at one end of the magnetic tape and means to prevent recording of any signal on said given portion of said second track.

5. The automatic tape driving system according to claim 1 wherein said given portions of said first and second sound tracks are located at at least one end of said magnetic tape.

* * * * *